Feb. 4, 1941.  A. R. LINTERN ET AL  2,230,809
VEHICLE VENTILATING AND HEATING APPARATUS
Filed Jan. 21, 1937  3 Sheets-Sheet 1
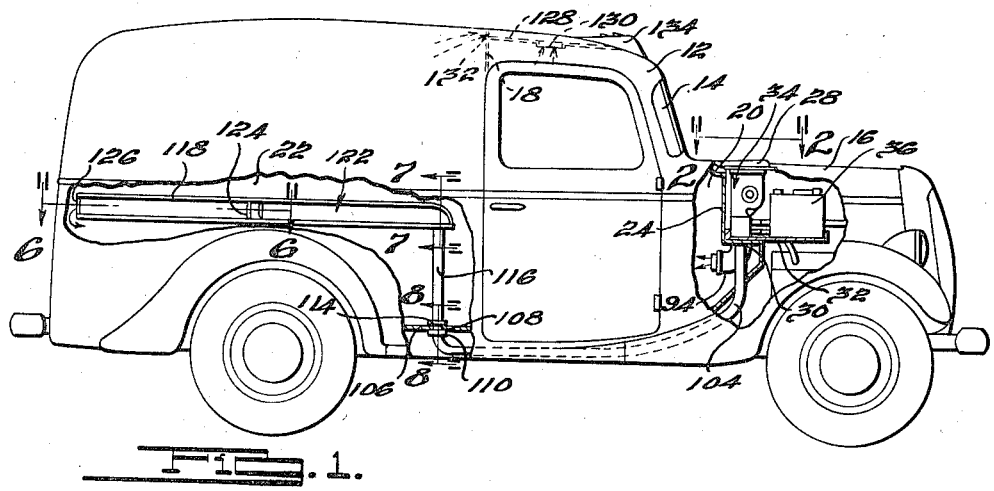
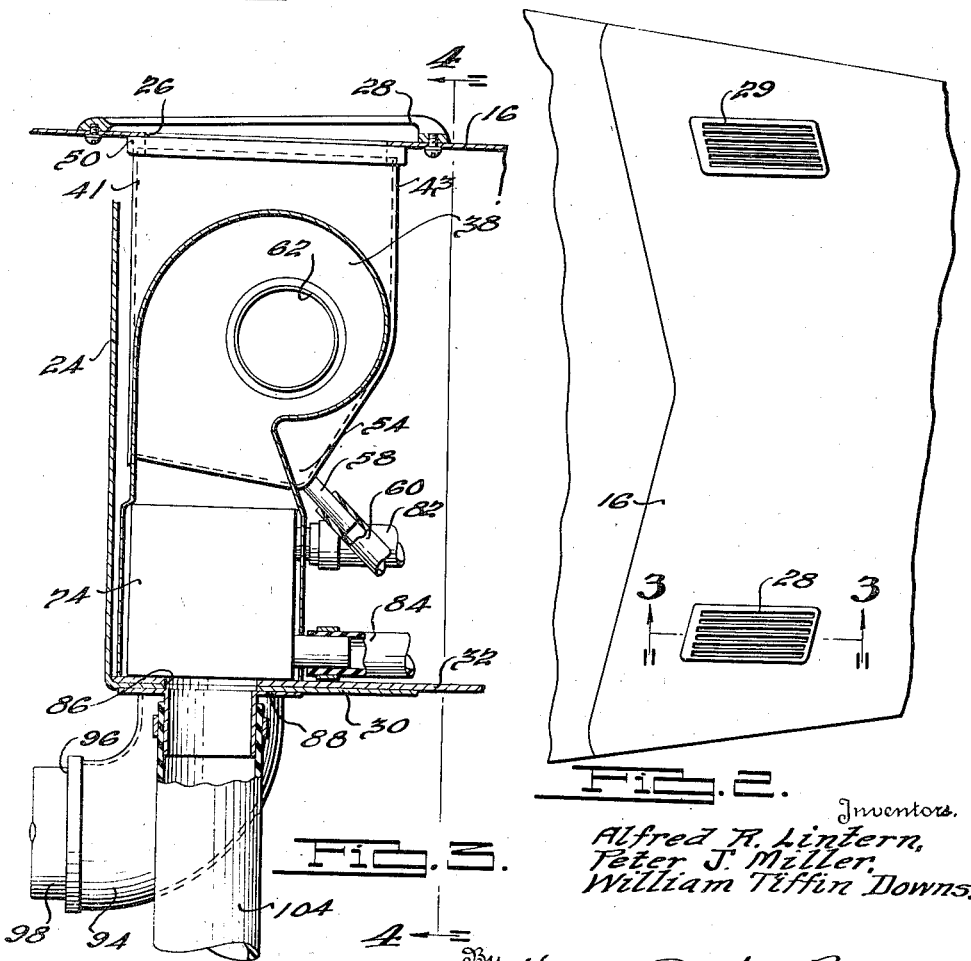
Inventors.
Alfred R. Lintern,
Peter J. Miller,
William Tiffin Downs.
By Harness, Dickey, Pierce & Hann
Attorneys.

Feb. 4, 1941.   A. R. LINTERN ET AL   2,230,809
VEHICLE VENTILATING AND HEATING APPARATUS
Filed Jan. 21, 1937   3 Sheets-Sheet 2
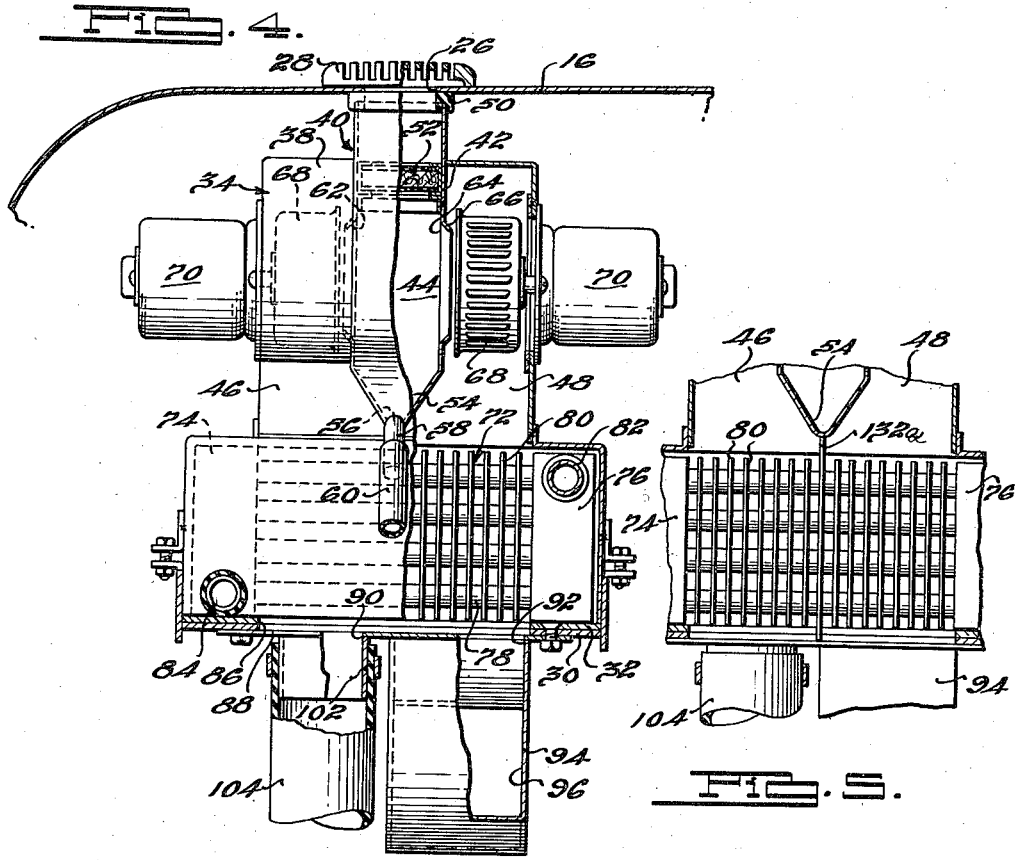
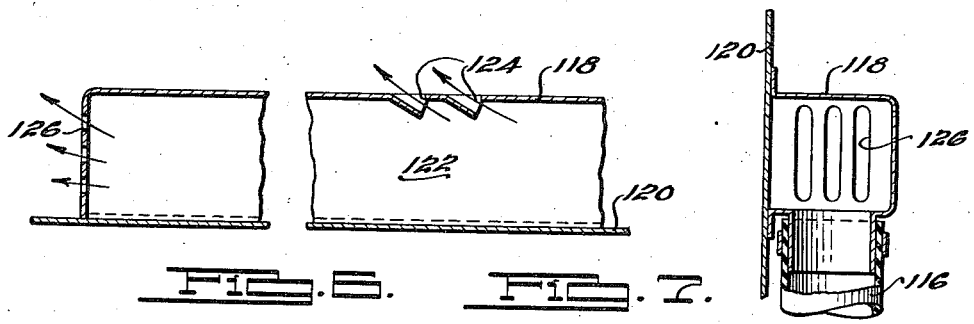
Inventors.
Alfred R. Lintern,
Peter J. Miller,
William Tiffin Downs.
By Harness, Dickey, Pierce & Haun.
Attorneys.

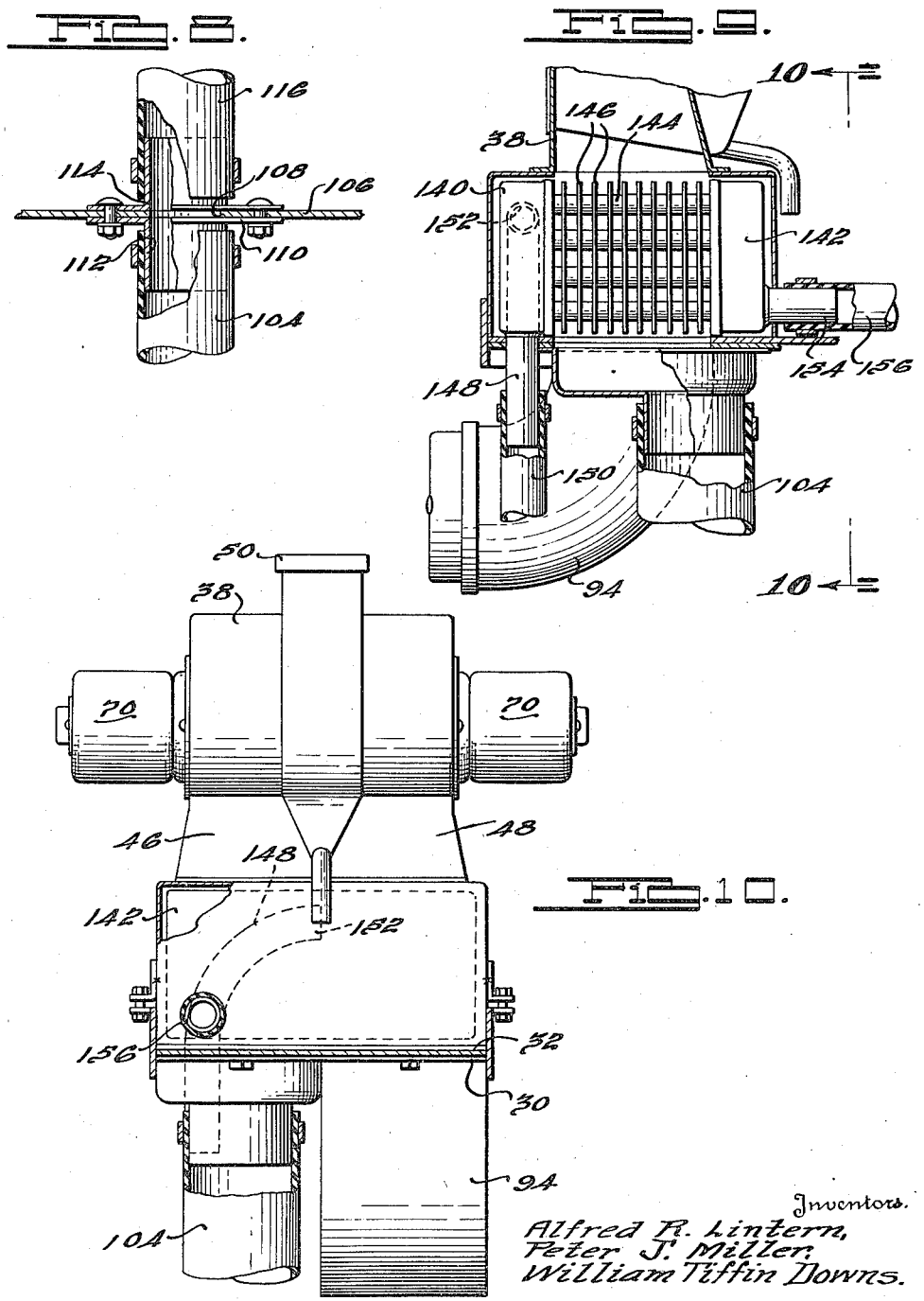

Patented Feb. 4, 1941

2,230,809

UNITED STATES PATENT OFFICE 2,230,809

VEHICLE VENTILATING AND HEATING APPARATUS

Alfred R. Lintern, Peter J. Miller, and William Tiffin Downs, Detroit, Mich., assignors to Evans Products Company, Detroit, Mich., a corporation of Delaware Application January 21, 1937, Serial No. 121,432

4 Claims. (Cl. 98—2)

This invention relates to an improved motor vehicle or automobile heating and ventilating unit and apparatus; and particularly relates to a complete hot water heating and ventilating unit supplying fresh outside air under vehicle movement caused by pressure from a high pressure region of the vehicle and readily installable in various types of existing present day or conventional automobiles by dealers or users and to a system or apparatus for heating and/or ventilating the separate storage compartments and the cabs of delivery vehicles.

Objects of the invention are to provide improved and simplified means for supplying fresh heated conditioned air into the interior of a vehicle body; to provide a complete heating and ventilating unit of large heating and air circulating capacity, preferably supplying and heating, when desired, fresh outside air from a vehicle movement induced high pressure region of the vehicle, which unit is so formed and mounted that it does not crowd the passengers or get in the way of their feet or knees and yet can be readily installed in existing conventional automobiles by dealers or the like; to provide such an upright unit which is narrow and otherwise formed so that it may be mounted alongside of the engine under the hood on the engine side of the dash or fire wall partition to discharge its air therethrough directly into the front part of the vehicle, and which receives its downward flow outside air under pressure from an opening through the movable hood; to provide an automobile air heating unit of this type and for such an installation efficiently arranged to employ the more efficient centrifugal blower wheel type of fan means; to provide an accessible mounting for an easily removable and cleanable air filter for such an automobile air heating or conditioning unit; to provide means for ventilating and also heating when necessary the separate storage compartments of delivery trucks whereby perishable materials and articles contained therein will be maintained in a fresh and satisfactory condition for delivery; to provide novel heating structures whereby fresh air is conducted from the outside past a heat exchanger and distributed in spaced and separate compartments within the vehicle body; to provide a novel heating structure in which the heating medium conducted to a heat exchanger is so discharged within one of the headers of the heat exchange structure that the heating medium is evenly distributed across the heating core to thereby evenly heat the air passed over the heat exchanger; to provide an improved ventilating and heating structure whereby fresh heated air may be distributed into the front compartment and into a rear compartment of a vehicle, the distribution to each of the compartments being independent of the distribution to the other compartment; to provide a structure whereby air within the storage compartment of a vehicle is properly circulated therein; to provide a simple arrangement for supplying fresh heated air into the several compartments of a vehicle and exhausting the stale air therefrom; and to provide a ventilating and heating structure which is economical to manufacture, efficient in use, and readily installable in existing motor vehicles.

Other objects of the invention will become apparent from the following specification, the drawings relating thereto, and from the claims hereinafter set forth.

In the drawings in which like numerals are used to designate like parts in the several views throughout;

Figure 1 is a side elevational view, with parts broken away, of a vehicle embodying features of the present invention;

Fig. 2 is a partial plan view taken substantially in the direction of the arrows 2—2 of Fig. 1;

Fig. 3 is a partial vertical cross-sectional view taken substantially along the line 3—3 of Fig. 2;

Fig. 4 is a partial elevational view, with parts broken away, showing parts in cross section, taken substantially along the line 4—4 of Fig. 3;

Fig. 5 is a fragmentary vertical cross-sectional view of a modified form of the structure shown in Fig. 4;

Fig. 6 is a broken cross sectional view taken substantially along the line 6—6 of Fig. 1;

Fig. 7 is a vertical cross sectional view taken substantially along the line 7—7 of Fig. 1;

Fig. 8 is a fragmentary elevational view with parts broken away showing parts in cross section taken substantially along the line 8—8 of Fig. 1;

Fig. 9 is a vertical cross sectional view, similar to Fig. 3, showing a modified heat exchange structure; and Fig. 10 is an elevational view taken substantially along the line 10—10 of Fig. 9.

The present invention is illustrated in use with a vehicle of the delivery truck type; but, according to the broader aspects of the present invention, its use is not limited to vehicles of this type but all or portions of the organization may be used in other types of vehicles, such as conventional passenger automobiles, as will be apparent to those skilled in the art.

The present invention relates to a complete hot water heating and ventilating unit for motor vehicles or automobiles including passenger cars and trucks, which unit has all of the advantages set forth in the aforesaid objects of invention, and to a system or apparatus, preferably including such a unit, which is particularly adapted for use with delivery trucks of the type having an enclosed storage compartment within which perishable objects such as bread, flowers, and the like are stored for delivery. Trucks carrying such objects are often out on delivery for a considerable period of time; and during such delivery period, objects being delivered perish or freeze due to lack of fresh and/or heated air. To reduce losses caused by this destruction of the objects being delivered, it is necessary to reduce the delivery period by reducing the amount of objects carried per haul; and this results in the necessity of frequent returns for loading with a consequent high cost of delivery. According to the present invention, fresh air, warmed or heated when necessary, is constantly circulated within the storage compartment of the truck and the articles being delivered are therefore maintained in a fresh condition for considerably longer periods of time. The truck may then be more fully loaded and the delivery period increased to a maximum, thereby reducing the cost of delivery and providing for delivery of the objects to the customers in a fresh and satisfactory condition.

Also the present invention provides a structure which may be conveniently and economically installed on used or new vehicles; and provides for adequately ventilating as well as heating the passenger compartment of the vehicle as well as the storage compartment.

The present invention further contemplates the provision of novel heat exchange structures whereby the cold fresh air may be more efficiently heated.

For a better understanding of the invention, reference may be had to the drawings, in which a vehicle body 12 is illustrated having a front wall including a windshield 14 and a hood 16. A partition wall 18 divides the interior of the vehicle into a front passenger compartment 20 and a rear storage compartment 22. Access to the rear storage compartment 22 may be gained through a conventional rear door, not shown. A conventional dashboard, fire wall, or forward partition 24 separates and insulates the passenger compartment 20 from the engine compartment.

The partition or dash 24 adjacent its lower end has a forwardly extending substantially horizontal portion 30 which joins or connects the upwardly inclined footboard portion of the vehicle floor. It will be apparent that portion 30 forms a shelf or substantially horizontally extending ledge. All of the above structure is entirely conventional and, in fact, represents a well-known type of automobile passenger car or truck in which shelf or ledge portion 30 is normally used to carry the storage batter 36. The space in the passenger compartment under this portion 30 provides additional leg room for the passengers.

Many difficulties have been encountered in providing readily installable retail heaters (preferably of the cooling system-hot water type) for supplying all or part fresh outside air from a high pressure region on the vehicle. It is desirable to admit fresh air from a grille on a region of the body surface when high pressure is caused by forward movement of the vehicle so that the motor-blower unit need not be operated except when the car is standing or running at low speeds. An air scoop ruins the vehicle appearance and accordingly the most desirable intake region is the high pressure region on the body surface in front of the windshield, i. e. the cowl or the hood.

However, in most cases it is quite difficult if not impractical to make a non-factory installation of a fresh air supplied heater under the conventional cowl ventilator of a conventional car in which the space under this cowl ventilator is badly obstructed by other members.

Also, it is highly desirable that a heater unit be positioned out of the way of the front passenger's legs or knees and not in the normal foot space above the floor and behind the dash partition. This is particularly true of the larger heater unit with its large hot water core needed to properly heat all outside air.

Accordingly, the heater unit of the present invention is made upright—of appreciable height and relatively narrow width and depth—so that it can be mounted out of the passenger's way on the forward side of the dash partition in the engine compartment alongside of the engine. Its fresh air is supplied straight down from an opening in the movable hood and its heated air is discharged directly to the rear into the front of the vehicle.

In the automobile illustrated, the heater unit 34 is supported on and discharges its hot air down through the above-described shelf or ledge 30. As shown, an extension shelf 32 is supported and secured on ledge 30, and the forward end of this extension 32 carries the battery 36 forward of its normal position. The rear end of extension 32 directly carries the heater unit 34.

To provide a fresh air inlet opening, an opening 26 is provided or later cut through the upwardly movable hood 16 preferably at the right side of the hood, and a grille member 28 having longitudinally extending louvers is secured to the outer surface of the hood 16 in overlying relation to the opening 26. For the purpose of maintaining symmetry of appearance in the hood, a dummy grille 29 is provided on the left hand side of the hood in a position corresponding to that of the grille 28.

The heating unit 34 includes a casing or housing 38 within which the blowers and heating core, to be described in detail hereinafter, are mounted. The housing 38 may be considered as having an upper portion and a lower portion; and the upper portion is divided by wall members 40 and 42 into a central chamber 44 and side chambers 46 and 48.

The chamber 44 provides an air inlet duct and a distribution duct; and the wall members 40 and 42 forming this duct extend upwardly to a position immediately below and adjacent the opening 26 in the hood 16. End members 41 and 43 connect the ends of the extending portions of the wall members 40 and 42 to form with the wall members the closed inlet duct. A resilient strip member 50, preferably of sponge rubber or the like, embraces the upper edges of the members 40, 41, 42, and 43 adjacent the periphery of the opening 26 and engages the under side of the hood 16 when the hood is in its normally closed position to provide for sealing the passage of air into the inlet chamber 44 through the opening 26. A filter member 52, preferably of fibrous material such as rock wool or glass wool, is preferably mounted in and across this inlet duct and supported as shown in the path of the incoming air to clean the air and prevent the passage of dust or other foreign material into the interior of the vehicle.

It will be apparent that this filter pad of fibrous material may be readily inserted or removed through the open upper end of the inlet duct when the hood is raised. Thus it may be cleaned or changed.

The wall members 40 and 42 extend downwardly into the casing a substantial distance and are joined together adjacent the bottom thereof to provide a trough 54 within which any water passing into the inlet chamber 44 is collected. The walls forming the trough 54, adjacent the bottom thereof, are sloped to one of the corners, preferably the forward corner, and a drain opening 56 is provided adjacent this corner for draining any water collected in the trough. A tubular member 58 is provided over the opening 56; and an elongated flexible tubular member 60 embraces the outer end of the tubular member 58 for carrying the water to a convenient point for discharge.

Openings 62 and 64 are provided through the wall members 40 and 42, respectively, intermediate the ends thereof for communicating the distribution chamber 44 with the side chambers 46 and 48, respectively. An outwardly directed flange 66 is provided over each of the openings 62 and 64 for confining the passage of air into the side chambers, respectively.

A centrifugal blower or fan 68 is mounted within each of the side chambers 46 and 48 with the open faces of the blower wheels facing the openings 62 and 64, respectively, and with the outer periphery of each blower wheel extending beyond the periphery of the flanges 66 so that the air passing from the central chamber into the side chambers is confined in its passage into the interior of the blower. A suitable motor 70 is provided for operating and rotating each of the blowers 68. These electric motors 70 extend to the sides outside of the heater housing to be cooled and to make a more compact housing.

The side members 46 and 48 communicate with the lower portion of the housing 38 within which a horizontal hot water core, generally indicated at 72, is mounted transversely of the path of air from the side chambers.

The heating core 72 includes oppositely disposed header members 74 and 76 which are preferably in the form of hollow box members. The header members 74 and 76 are connected by a plurality of tubular members 78 having transversely disposed heat radiating fins 80 at spaced intervals thereacross. Conventional hot water inlet and outlet pipes 82 and 84, respectively, are connected to the water cooling system of the engine in a conventional manner and are also connected to the headers 76 and 74, respectively. The hot water circulates through the core from the header 76, through the connecting elements 78, to the header 74, and back to the engine water cooling system. A transversely extending opening 86 is provided through the members 30 and 32 communicating with the interior of the housing 38 adjacent the bottom thereof.

To provide for distributing the air passing through the opening 86 into the front passenger compartment and the rear storage compartment, respectively, a member 88 having a pair of openings 90 and 92 is mounted on the under surface of the horizontal portion 30 over the opening 86. An elbow shaped member 94 is provided over the opening 92 and extends downwardly and then rearwardly to direct the passage of air into the passenger compartment 20 through the opening 96. The opening 96 of the member 94 is provided with control doors or shutters 98 for controlling the direction and volume of air entering the passenger compartment through the member 94.

The member 88 is also provided with a downwardly extending tubular flange 102 adjacent the opening 90, and an elongated flexible tubular member 104 securely embraces the flange 102 and extends rearwardly, preferably under the front passenger compartment 20, to a position adjacent the under side of the floor 106 of the rear compartment 22.

A rigid member 110 having a downwardly directed tubular portion 112 underlies the opening 108, and the flexible tubular member 104 securely embraces the tubular portion 112. A member 114, similar to the member 110, overlies the opening 108 and an elongated flexible tubular member 116 embraces the tubular portion of the member 114.

To provide for distributing and properly circulating the air in the storage compartment 22, an elongated member 118 having an open face is mounted within the storage compartment 22 longitudinally thereof with the open face against the inside of one of the side walls 120 of the vehicle body 12 to provide an air confining and distribution duct 122. The tubular member 116 communicates with the distribution duct 122 through an opening in the member 118; and the air from the duct 122 is distributed to the interior of the compartment 22 by means of spaced openings 124 in the side walls of the member 118 and through openings 126 at the rear end of the member 118. The forward end of the member 118 is preferably closed; and it is to be understood that openings may be provided in any position desired of the member 118 to obtain the desired air distribution within the storage compartment. The member 118 is preferably located intermediate the roof and floor of the storage compartment 22 in spaced relation to the floor so that proper circulation of the air in all directions is obtained.

To provide for exhausting the stale air from the passenger compartment 20 and the storage compartment 22, an exhaust duct 128 (see Fig. 1) is provided in the roof structure preferably above the passenger compartment, and communicates with the passenger compartment through an opening 130 and with the storage compartment through an opening 132 in the partition 18. An exhaust unit 134 is provided above the roof of the vehicle adjacent the front wall thereof and communicates with the single exhaust duct 128 for exhausting the stale air from both the passenger compartment and the storage compartment. The exhaust unit illustrated is similar to that described and claimed in the co-pending application of William Lintern and John B. Lintern, Serial No. 1916, filed January 15, 1935, now Patent 2,073,159 of March 9, 1937, and it will be apparent that it is so positioned and formed that it draws or exhausts air from the vehicle into the low pressure region caused by forward vehicle movement and located in the roof behind its front and the windshield.

In the operation of the apparatus so far described the centrifugal blowers 68 draw the fresh air inwardly into the central chamber 44 through the opening 26 in the hood and cause the air to pass downwardly through the side chambers 46 and 48 past the heating core 72. When the vehicle is moving forward at reasonable speed the relatively high pressure above the opening 26 forces air through the heater into the vehicle without the blowers. If used, they are aided by this pressure. The air under pressure enters the plenum chamber 44, turns to the side into the open end of the centrifugal blower, and is thrown straight out by it into annular space 48 to be directed straight down through the hot water core 72. The freshly heated air is passed into the passenger compartment through the member 94 and the volume and direction controlled by the shutter 98. The air passes into the storage compartment 22 through the opening 90 and is confined in its passage to the rear compartment by means of the tubular members 104 and 116 into the distribution duct 122. Air from the distribution duct passes through the openings 124 and 126 into the interior of the rear compartment 22 and is circulated therein around the objects to be delivered thereby maintaining them in a fresh condition. The stale air in the storage compartment 22 is exhausted therefrom through the opening 132, the exhaust duct 128 and the exhaust unit 134.

To obtain varied ventilating results either one or both of the blowers 68 may be operated and by control of the shutters 98 the volume of air entering the passenger compartment and the storage compartment respectively may be effectively controlled. For example, by closing the shutters 98, all of the air is directed to the storage compartment; and by regulating the shutter openings the amount of air directed to the storage compartment may be effectively controlled.

A modified structure to obtain a different operation is illustrated in Fig. 5 in which a central separating fin 132a is provided which extends outwardly beyond the outer periphery of the remaining fins 80 into engagement with the lower edge of the trough 54 and the sides of the casing housing 38, and downwardly into engagement with the member 88 to separate the passage of air from the side chambers 46 and 48 respectively through and past the heating core. All of the air from the side chamber 46 is therefore confined in its passage through the heating core and passes to the rear compartment 22 through the tubular conduit 104; and all of the air from the side chamber 48 passes directly into the passenger compartment 20. By then controlling the operation of each of the blowers 68, the volume of air entering the passenger and storage compartments respectively may be independently controlled.

In the structure shown in Figs. 9 and 10 a modified form of heating core is illustrated in which an inlet header 140 and an outlet header 142 are mounted within the housing 38 with the inlet header 140 adjacent the rear of the housing and the outlet header 142 adjacent the front wall of the housing. The headers 140 and 142 are connected by a plurality of tubular elements 144 communicating with the interior of each of the headers; and heat radiating fins 146 extend transversely of the tubular elements 144 in the path of air from the side chambers 46 and 48.

In order to provide for more even distribution of the heating medium from the water cooling system of the engine, an inlet pipe 148, connected by a flexible tube 150 to the water cooling system in the usual manner, extends into the header 140 through an opening adjacent one side of the header and is curved upwardly and towards the center of the header 140 interiorly thereof. The heating medium is discharged into the header from the open end 152 near the top of the header and substantially at its longitudinal center. By discharging the heating medium substantially at this point it has been found that a more even distribution of the heating medium across the core is provided. Therefore, the air is more evenly heated.

The outlet header 142 is provided with a tubular element 154 communicating with the interior of the header and through which the heating medium is returned to the engine cooling system through a flexible conduit 156 in the usual manner.

By this arrangement of the headers within the casing and the arrangement of the inlet and outlet conduits shown and described, a compact unit is obtained and space is conserved.

The arrangement of the ducts and blowers within the housing 38 and the arrangement of the outlets for the heated air to distribute the air to the passenger compartment and the storage compartment are substantially the same for the structure shown in Figs. 9 and 10 as for that shown in Figs. 1 to 8.

Formal changes may be made in the specific embodiments of the invention described without departing from the spirit and substance of the broad invention, the scope of which is commensurate with the appended claims.

What is claimed is:

1. Vehicle ventilating and heating apparatus comprising a vehicle having a dashboard and a hood, said hood having an opening therethrough forwardly of said dashboard, a housing mounted forwardly of said dashboard below said opening, the upper portion of said housing being divided into a central chamber and side chambers, a blower located within each of said side chambers, means communicating said central chamber with said hood opening, said central chamber being in communication with said side chambers, a heat exchanger located below said side chambers, means communicating said housing with the interior of said vehicle, and means for operating said blowers for drawing air through said opening into said housing, past said heat exchanger, and discharging the air into the interior of the vehicle.

2. Vehicle ventilating and heating apparatus comprising a vehicle having a dashboard and a hood, said hood having an opening therethrough forwardly of said dashboard, a housing mounted forwardly of said dashboard below said opening, the upper portion of said housing being divided into a central chamber and side chambers, said central chamber extending upwardly to a position adjacent said opening to provide a duct in communication with said opening, a blower located within each of said side chambers, means communicating said central chamber with said side chambers, a heat exchanger located below said side chambers, means communicating said housing with the interior of said vehicle, and means for operating said blowers for drawing air through said opening into said housing, past said heat exchanger, and discharging the air into the interior of the vehicle.

3. Vehicle ventilating and heating apparatus comprising a vehicle having a dashboard and a hood, said hood having an opening therethrough forwardly of said dashboard, a housing mounted forwardly of said dashboard below said opening, wall members dividing the upper portion of said housing into a central chamber and side chambers, said wall members having openings therethrough communicating said central chamber with said side chambers respectively, said wall members extending upwardly to a position adjacent the hood opening to provide an air inlet duct, and said wall members extending downwardly below the openings in said wall members, a drain opening communicating with the interior of said central chamber adjacent the lower end thereof, a blower located within each of said side chambers, a heat exchanger located below said side chambers, means communicating said housing with the interior of said vehicle, and means for operating said blowers for drawing air through said opening into said housing, past said heat exchanger, and discharging the air into the interior of the vehicle.

4. Vehicle ventilating and heating apparatus comprising a vehicle having a dashboard and a hood, said hood having an opening therethrough forwardly of said dashboard, a housing mounted forwardly of said dashboard below said opening, wall members dividing the upper portion of said housing into a central chamber and side chambers, said wall members having openings therethrough communicating said central chamber with said side chambers respectively, said wall members extending upwardly to a position adjacent said hood opening to provide an air inlet duct, a blower located within each of said side chambers for drawing air into said side chambers respectively through said inlet duct, a transversely extending heat exchanger located within the lower portion of said housing, an upright separating member mounted within the lower portion of said housing, and the construction and arrangement being such that first and second separate air passages are provided for the side chambers respectively through and past said heat exchanger, and means for independently communicating said first and second passages with the interior of said vehicle body.

ALFRED R. LINTERN.
PETER J. MILLER.
WILLIAM TIFFIN DOWNS.